United States Patent [19]

McCulloch

[11] 4,454,804
[45] Jun. 19, 1984

[54] APPARATUS FOR INCORPORATING ADDITIVES IN EXTRUDED FOODS

[75] Inventor: Michael G. McCulloch, Northridge, Calif.

[73] Assignee: Carnation Company, Los Angeles, Calif.

[21] Appl. No.: 274,973

[22] Filed: Jun. 18, 1981

[51] Int. Cl.$^3$ ............................................. A23J 1/00
[52] U.S. Cl. ..................................... 99/348; 99/353; 99/483; 99/494; 99/516; 425/72 R; 425/208; 425/308
[58] Field of Search ................................. 99/352–354, 99/348, 494, 470, 483, 516, 534, 536; 366/76, 79, 96–99, 101, 102, 167–170, 173, 177, 178, 318; 426/511, 514, 634, 802, 250, 104, 274; 425/131.1, 145, 182, 308, 310

[56] References Cited

U.S. PATENT DOCUMENTS

| | | | |
|---|---|---|---|
| 3,347,287 | 10/1967 | Geber | 425/131.1 X |
| 3,496,858 | 2/1970 | Jenkins | 426/634 |
| 3,558,324 | 1/1971 | Page et al. | 426/104 |
| 4,039,691 | 8/1977 | Hildebolt | 426/511 |
| 4,175,486 | 11/1979 | Hildebolt et al. | 99/483 |

*Primary Examiner*—Timothy F. Simone

*Attorney, Agent, or Firm*—Eugene C. Ziehm; Robert D. Kummel

[57] ABSTRACT

A method and apparatus for incorporating one or more additives throughout an expanded food product. An expandable mixture of moistened farinaceous and/or proteinaceous materials is extruded at elevated temperatures and pressures through the die orifice of an expander-cooker into the cylindrical bore of a tubular extrusion die which is secured to the external face of the extruder die plate. The cylindrical bore of the tubular die has the same cross-sectional area and shaped as the die orifice of the extruder, so that as the mixture passes longitudinally through the tubular die it is still radially confined and is maintained at the same high pressure and temperature as when extruded through the die orifice. One or more liquid additives are injected under pressure into the body of the farinaceous and/or proteinaceous mixture as it is passed through the tubular die, through a nozzle mounted concentrically within the cylindrical bore of the tubular die. As the material is extruded from the tubular die into the atmosphere, it expands to form a porous structure. Simultaneously with the expansion of the mixture, the liquid additive diffuses throughout the porous structure, from the center to the exterior surfaces thereof, to thereby provide a porous expanded product in which the additive is incorporated throughout the product.

5 Claims, 3 Drawing Figures

U.S. Patent Jun. 19, 1984 4,454,804
FIG. 2
FIG. 3
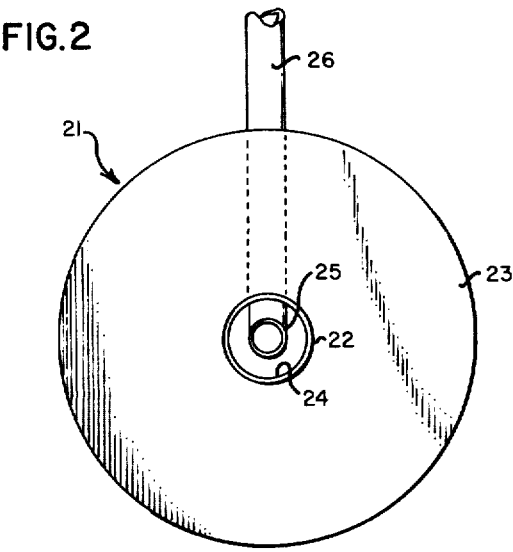
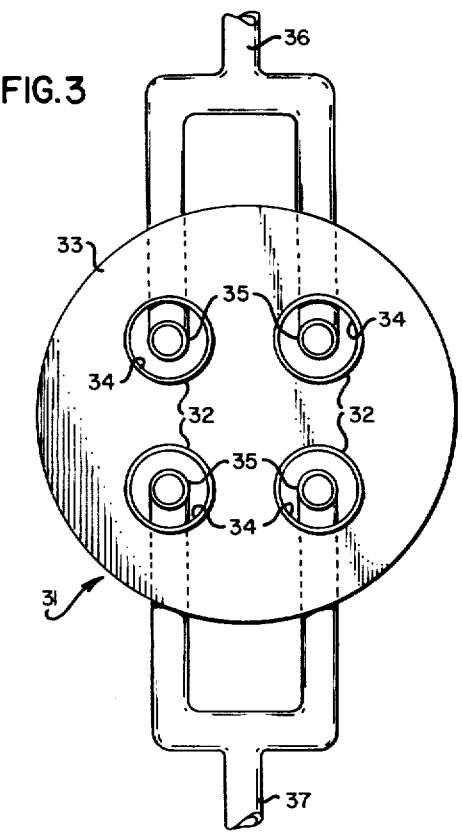
FIG. 1
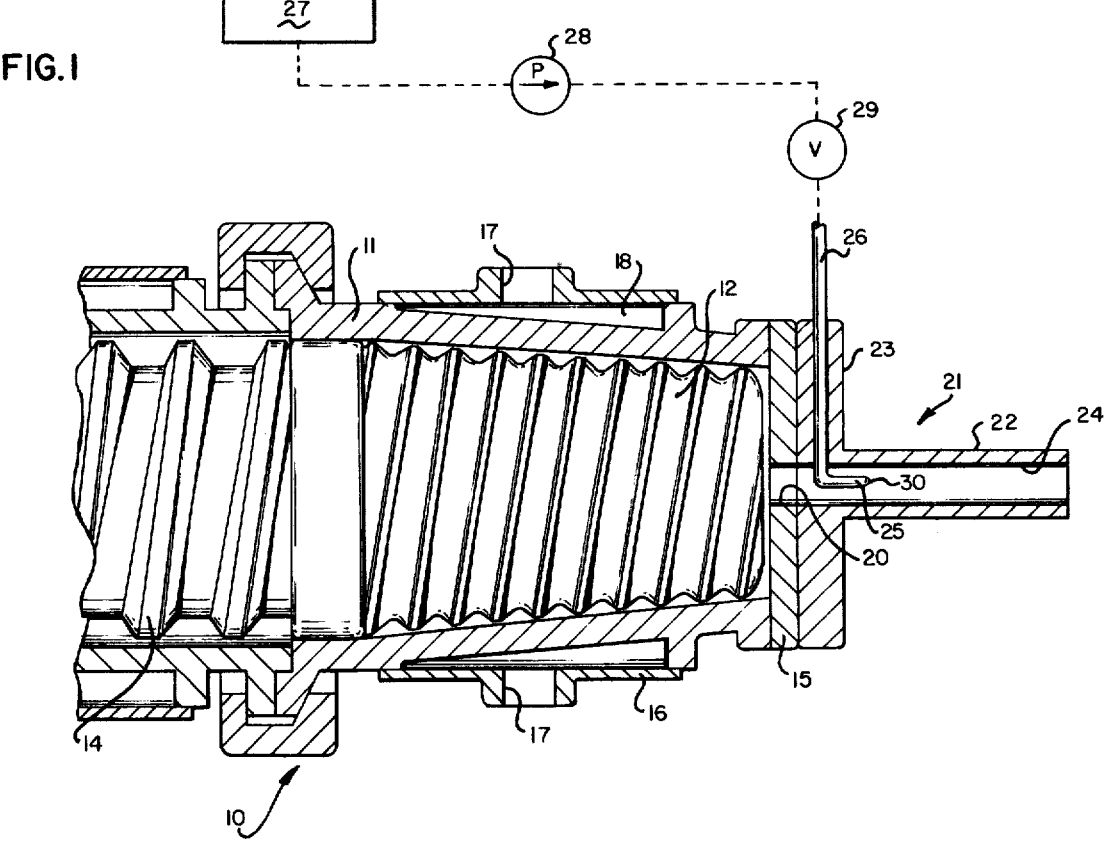

APPARATUS FOR INCORPORATING ADDITIVES IN EXTRUDED FOODS

BACKGROUND OF THE INVENTION

This invention relates to the production of an expanded food product. More particularly, the invention relates to a method and apparatus for incorporating an additive uniformly throughout an extrusion-expanded food product.

The production of extrusion-expanded food products, both those intended for human consumption and those for use as pet foods, is well known in the food industry. Typically such products are produced in an extrusion cooker of the general type disclosed in U.S. Pat. Nos. 3,117,006 and 3,385,709, in which a moistened mixture of farinaceous and/or proteinaceous materials is introduced into the extruder in which the mixture is subject to mechanical working at elevated temperatures and pressures and is extruded through an extrusion die into the atmosphere. As the material issues from the die, it expands into a porous expanded product due to the pressure drop across the die and the flashing off of water as steam. The extrudate is then cut into pieces of a desired length and dried. Examples of food products for human consumption which can be prepared by such procedures are disclosed in U.S. Pat. Nos. 3,104,975 to Bowman, 3,117,006 to Wenger and 3,385,709 to Wenger et al, and examples of the production of expanded animal food products are disclosed in U.S. Pat. Nos. 3,119,691 to Ludington et al, 3,447,929 to Hale, and 3,891,774 to Baker et al.

While the expanded food products produced by such procedures are nutritious, it is frequently desired to incorporate one or more additives such as flavoring materials, palatability enhancers, coloring agents, and the like in the expanded product to improve the flavor of the product, or provide the expanded product with the appearance of meat, and the like. Melted fat, usually tallow, is commonly coated onto the product to improve its palatability, particularly when pet food products are being produced. For example, U.S. Pat. No. 3,119,691 to Ludington et al discloses coating the expanded particles with fat and a liquid meat extract. U.S. Pat. No. 4,104,407 to Stringer et al discloses coating the expanded particles with a dextrin material and fat. U.S. Pat. No. 4,215,149 to Majlinger discloses coating the expanded particles with fat and a salt of phosphoric acid. U.S. Pat. No. 3,745,023 discloses coating the expanded particles with a composition containing modified animal fat extracts, vegetable oil and fish oil. U.S. Pat. No. 4,211,797 to Cante et al discloses coating expanded particles with a blend of lipolyzed beef tallow and digest of beef. In each of these disclosures, the fat and other additives are incorporated by coating the material on the surface of the expanded pieces, such as by spraying, tumbling, dipping, and the like. While such an application of the additive is effective to enhance the palatability or other characteristics of the expanded food, it is subject to certain disadvantages. For example, an additional processing step is required in the production of the product. Moreover, when fat is applied to the surface of the expanded pieces, the fat-coated surface is greasy and requires packagers to sell the product in grease-resistant lined containers, since paper containers absorb the fat, resulting in an unsightly package. Also, the fat coating on the product is exposed to the oxygen of the air and is thus subject to oxidative rancidity.

Prior attempts to include such additives, particularly fat, directly into the matrix of the expanded product have not been entirely successful. Thus, when fat is added to the farinaceous and/or proteinaceous mix in the expander, the fat has a tendency to be expressed from the ingredient mix during the extrusion process. Attempts to add substantial amounts of fat directly to the ingredient mixture prior to extrusion have reduced product expansion to such an extent that the products become undesirably dense. In order to avert these difficulties, a number of procedures have been suggested heretofore in order to incorporate fat or other additives in the matrix of the expanded product by the addition of fat and other additive to the ingredient mixture prior to extrusion, such as disclosed in U.S. Pat. Nos. 3,908,025 to Miller et al, 4,020,187 to McCulloch et al, and 4,225,630 to Pitchon.

SUMMARY OF THE INVENTION

The present invention is directed to an apparatus for producing an expanded food product in which an additive is incorporated substantially uniformly throughout the matrix of the expanded product. An expandable mixture of moistened farinaceous and/or proteinaceous materials is introduced into a conventional extrusion cooker in which the mixture is subjected to mechanical working sufficient to raise the temperature of the mixture to substantially above 212° F. and the mixture is compressed to a relatively high pressure, and the mixture is thereafter extruded through a die orifice in which the mixture is further compressed. The material is extruded through the die orifice into an elongated tubular extrusion die, mounted adjacent the die orifice, in which the material remains under elevated pressure and temperature. One or more additives, such as fat, coloring agents, flavoring material, etc., in liquid form, are injected into the center of the hot, pressurized mix as it passes through the tubular extrusion die, through an injection nozzle mounted concentrically within the tubular die, so that the additives are deposited within the pressurized material. As the material is extruded from the tubular die into atmospheric conditions, the superheated moisture partially flashes off to cause the material to expand, with the expanded product having a porous structure. As the material expands, the liquid additive permeates throughout the porous structure, from the center to the surface thereof. The expanded extrudate is then cut into pieces of a desired size upon exiting the tubular die, and may be dried to further reduce the moisture content of the pieces.

BRIEF DESCRIPTION OF THE DRAWINGS

FIG. 1 is a partial, longitudinal, cross-sectional view of an extruder embodying the concept of the present invention.

FIG. 2 is an end view of the tubular extrusion die of the present invention, as shown in FIG. 1.

FIG. 3 is an end view of another embodiment of the tubular extrusion die.

DETAILED DESCRIPTION OF THE INVENTION

The present invention will be described in detail hereinafter in connection with the production of an expanded pet food product. It will be understood, however, that the method and apparatus of this invention are equally suitable to the production of expanded products intended for human consumption.

In accordance with the present invention, an expandable mixture of moistened farinaceous and/or proteinaceous materials is introduced into a conventional extrusion cooker, such as a commercially available Wenger cooker-extruder or Anderson expander, in which the mixture is subjected to mechanical working under elevated heat and pressure, and forced through a die orifice. Farinaceous ingredients which may be used include wheat, corn, barley, oats, and the like, and their derivatives such as corn meal, hominy, wheat middlings, wheat germ, etc. Typically the amount of farinaceous ingredients in the expandable mixture comprises between about 30% to 70% by weight of the mix.

The mixture may also include one or more proteinaceous ingredients of vegetable, animal or fish origin, such as soy bean meal, soy grits, meat meal, bone meal, poultry meal, fish scrap and combinations thereof. Typically, the proteinaceous ingredients comprise between about 20% to 50% by weight of the mix.

The balance of the mixture may comprise salts, flavorings, colorings, vitamin supplements, minerals, and other like ingredients to form a nutritionally balanced pet food product. In general, the mixture introduced into the extrusion cooker has a moisture content of about 10% to 15%.

The ingredients are blended and introduced into a conventional extruder-cooker where the mixture is subjected to mechanical working under elevated temperatures and pressures to rapidly cook the mixture, and is extruded through a die orifice. The temperatures in the extrusion zone are substantially above 212° F., preferably between about 250° F.-350° F. Steam and/or water may be injected to control moisture and temperature of the mixture. The pressures developed within the extruder at the die plate should be above the vapor pressure of water at its extrusion temperature, typically between about 25-600 psi.

As the material is extruded through the die orifice, it passes directly into an elongated tubular extrusion die which is mounted on the exterior face of the die plate of the extrusion cooker. Thus, the cooked mixture is forced under pressure through the die orifice of the extruder into the tubular extrusion die having a cylindrical bore which is axially aligned and in communication with the die orifice, with the cylindrical bore having an internal diameter substantially the same cross-sectional area and shape as the die orifice. The cooked material remains under elevated pressure and temperature as it is forced through the tubular die since the cylindrical bore prevents expansion of the material.

As the material passes along the length of the tube, an additive, in liquid form, is injected into the cooked material. Thus, the liquid additive is pumped through an injection nozzle which is coaxially mounted within the cylindrical bore of the tubular die under a pressure sufficient to deposit the additive in the interior of the hot pressurized cooked material.

The type of additive deposited in the cooked material is not critical to the process of the present invention, as long as it is sufficiently fluid to be pumpable. Any of the numerous additives usually coated onto expanded pet food products may be used, including fats or oils such as tallow, lard, vegetable oils and the like; flavor or palatability enhancers such as hydrolyzed protein, animal or poultry digest, hydrolyzed protein, dextrins, spices, coloring materials, and the like. When a fat is to be incorporated as the additive, it is heated to liquify the fat prior to being pumped into the pressurized cooked material. If desired, the additive may be mixed in a water base to provide a liquid solution or suspension of the additive which is injected into the cooked material. The amount of additive deposited in the cooked material is regulated in relation to the quantity of the cooker material being forced through the tubular extrusion die and the desired effect of the additive, and may range from about 2% to 20% or more of the product. For example, when fat is used as the additive, the rate of fat addition is controlled so that the amount of fat deposited in the cooked material constitutes between about 4% to 10% or more, based on the dry weight of the expanded product.

Preferably, the injection nozzle is mounted concentrically within the cylindrical bore of the tubular extrusion die, at or near the upstream end of the tubular die, adjacent the die orifice of the expander. As the pressurized cooked material is forced through the elongated tubular die beyond the injection nozzle, the additive begins to migrate outwardly from the interior of the confined material. When the cooked material exits the tubular extrusion die into the atmosphere, it expands into a porous expanded product due to the pressure drop across the die opening and the flashing off the water contained in the extruded product as steam. The expansion of the cooked material causes the additive to diffuse substantially uniformly throughout the porous structure, from the center to the surface thereof. In this manner, a desired additive is incorporated in the expanded product during the expansion of the product, thereby eliminating the need for separately coating the expanded product. The extrudate, which typically has a moisture content of about 20% to 35% by weight, is then cut into small chunk-like pieces by a rotating knife, and is passed through a conventional dryer to reduce the moisture content of the expanded pieces to about 7% to 15%.

One embodiment of the apparatus of the present invention will be described by reference to FIGS. 1 and 2, in which a food product extruder of the type disclosed in U.S. Pat. Nos. 3,117,006 to Wenger and 3,358,709 to Wenger et al is broadly designated by the numeral 10, and includes a housing 11 and an extruder screw 12. Screw 12 is provided with flights 14 which force a mass of moistened farinaceous and/or proteinaceous material, capable of expanding after extrusion, toward die plate 15. Die plate 15 is provided with a die orifice 20 through which the material is forced at an elevated temperature and pressure. Housing 11 may be provided with an annular jacket 16 having inlet and outlet connections 17 to facilitate circulation of a heating fluid through chamber 18 for heating the material as it is moved toward die plate 15 by flights 14. However, in many cases, a sufficient product forming temperature is developed in the material by friction as it is compressed and forced toward die plate 15. Alternatively, cooling fluids may be circulated through chamber 18 to control the temperature of the food material if it becomes excessively high. If desired, steam may be injected into the material in the extruder to increase the temperature and/or moisture content of the material. Generally, the farinaceous and/or proteinaceous mixture being processed should have a moisture content at the time of extrusion of about 10% to 35% by weight. Additionally, the temperature of the material as it is forced through orifice 20 in die plate 15 should preferably be in the range of between about 250° F.–350° F., while temperature in the range of about 225° F.–400° F. are acceptable. Also, the pressure developed at die plate 15 should be above the vapor pressure of water at its extrusion temperature, generally between about 25–600 psi.

Tubular extrusion die 21, comprising an elongated tube 22 mounted on base plate 23, is secured by any suitable means to the exterior face of die plate 15. A cylindrical bore 24, which is axially aligned with die orifice 20, extends through tubular extrusion die 21, with the inner end of bore 21 being contiguous with and in communication with the die orifice 20. The internal diameter of bore 24 has substantially the same cross-sectional area and configuration as that of die orifice 20, so that as the farinaceous and/or proteinaceous mixture is extruded at elevated pressure through orifice 21, it passes directly into cylindrical bore 24 in which the material is maintained under the same elevated pressure as when it passes through the die orifice. Thus, as the mixture is longitudinally forced through the cylindrical bore of the tubular die, it is radially restricted along the length of the tube and maintained under high pressure and elevated temperature. The length of tubular extrusion die 21 is not critical, and may have a length of about 2 to 15 times its internal diameter.

Injection nozzle 24 having a discharge opening 30 is mounted concentrically within cylindrical bore 24 of the tubular extrusion die 21, adjacent die orifice 20, to deliver a liquid additive, under pressure, to the interior of the mixture being carried through the tubular die member. The injection nozzle 25 is fed by a line 26 from a supply tank 27 in which the additive is maintained in liquid form. A suitable pump 28 is provided in feed line 26 to deliver the liquid additive to the injection nozzle under sufficient pressure to deposit the additive in the pressurized mixture in the tubular die. A check value 29 or other similar device is preferably provided in line 26 to prevent backflow of the additive through the feed line 26. If tallow, which is not normally a liquid at ambient temperature, is used as the additive, it is heated to about 90° F. or higher to liquify the tallow prior to being pumped to the injection nozzle. For example, supply tank 27 may be provided with heating coils to maintain the tallow in a liquid state.

As the mixture emerges from the tubular extrusion die under the high internal pressure, into atmospheric conditions, the superheated equilibrium moisture partially flashes off by evaporation to cause product expansion. Simultaneously, the liquid additive is diffused throughout the expanded material, from the center to the outer surfaces. The extruded rope of material is cut into pieces of a desired length by a rotating knife (not shown) rotatably mounted adjacent the discharge end of the tubular extrusion die.

Another embodiment of the invention is illustrated in FIG. 3 in which the tubular extrusion die is adapted to be used in conjunction with an extruder die plate have a plurality of circumferentially spaced die orifices therein. As shown in FIG. 3, the tubular extrusion die 31 is provided with a plurality of elongated tubes 32 extending from base plate 33, with each of the tubes 32 having a cylindrical bore 34 which is in axial alignment with a die opening in the extruder die plate. An injection nozzle 35 is mounted within each of the cylindrical bores, with the injection nozzles being fed by lines 36 and 37 from the same or different liquid additive supply tanks. For example, a liquid solution or suspension of a dye of one particular color may be pumped through line 36, while a different color dye may be pumped through line 37. Alternatively, a different liquid additive may be fed to each injection nozzle, so that an expanded product having a variety of colors and/or flavors may be produced simultaneously utilizing a single extruder.

The invention is further illustrated by the following examples.

EXAMPLE I

A dry, expanded pet food product was produced from the following ingredients:

| Ingredient | Percent |
| --- | --- |
| Ground corn | 65.4 |
| Corn gluten | 11.5 |
| Meat and bone meal | 11.0 |
| Soy meal | 11.0 |
| Salt | 1.0 |
| Vitamins and minerals | .1 |

The ingredients were mixed together and ground through a 3/64" hammermill. The mixture was introduced into a Wenger X-25 extruder in which the material was subjected to temperatures and pressures averaging about 250° F. and 300 psi, respectively, at the die plate. The mixture was extruded through a 7/16" circular die opening directly into a tubular extrusion die as shown in FIGS. 1 and 2, in which the tubular die had a cylindrical bore 7/16" in diameter and about 5 inches in length. An injection nozzle was mounted concentrically within the cylindrical bore, with the discharge end of the nozzle being situated about 1.5 inch from the outer face of the die orifice. Hot liquified tallow, at about 150° F., to which has been added a small amount of a dye, was pumped from a supply tank through the injection nozzle into the body of material being forced through the cylindrical bore, at a rate sufficient to provide the product with a fat level of about 6%. The mixture was extruded from the tubular die into the atmosphere in the form of an expanded rope which was cut into pieces about 1" in length and dried at 280° F. The resulting product had a porous expanded structure with the fat and dye being uniformly distributed throughout the product from the center to the outer surfaces.

EXAMPLE II

The process of Example I was repeated except that a liquid additive containing equal parts by weight of tallow and chicken digest together with a small amount of dye, was pumped at a temperature of 150° F. through the injection nozzle into the body of the farinaceous and proteinaceous mixture confined in the tubular extrusion die, at a rate sufficent to obtain an additive level of about 6% by weight of the finished product. Examination of the dried product showed that the tallow, digest and dye had permeated throughout the porous expanded pieces, even to the exterior surfaces of the pieces.

While the invention has been particularly described in connection with the production of expanded pet food products, it will be understood that the present invention is equally well suited for incorporating an additive in the production of expanded farinaceous and/or proteinaceous products intended for human consumption, such as, for example, expanded breakfast cereal products having coconut oil incorporated therein as a palatability enhancing additive.

It is recognized that various modifications of the invention as described herein may be made by those skilled in the art without departing from the scope of the appended claims.

What is claimed is:

1. An apparatus for producing an expanded food product having an additive incorporated therein, which comprises an extruder-cooker provided with a die plate having a die orifice therein through which an expandable food material is extruded, a tubular extrusion die mounted on said die plate, said tubular extrusion die comprising a tubular member having a cylindrical bore positioned over said die orifice with the die orifice and the cylindrical bore having substantially the same internal diameter and cross-sectional shape, and said cylindrical bore being axially aligned and contiguous with said die orifice to form a continuous channel with said die orifice through which the expandable food material is extruded, nozzle means carried by said extrusion die and mounted concentrically within said cylindrical bore adjacent said die orifice, and supply means for supplying a liquid under pressure to said nozzle means.

2. The apparatus defined in claim 1 in which the tubular extrusion die has a length of about 2 to 15 times the internal diameter of the cylindrical bore.

3. The apparatus defined in claim 1 in which the die plate has a plurality of circumferentially spaced die openings therein, the tubular extrusion die has a plurality of tubular members, with the cylindrical bore of each tubular member being positioned over and being axially aligned with one of said die orifices, and nozzle means is mounted concentrically within each cylindrical bore.

4. The apparatus defined in claim 3 in which each of said nozzle means is in communication with supply means to deliver a liquid under pressure to said nozzle means.

5. The apparatus defined in claim 3 in which said nozzle means are in communication with supply means deliver at least two different liquids to the tubular extrusion die.

* * * * *